United States Patent [19]

Kropp

[11] 4,288,493

[45] Sep. 8, 1981

[54] WATER-ACTIVATABLE CROSSLINKED ADHESIVE AND ENERGY CONTROL FILM MADE THEREWITH

[75] Inventor: James E. Kropp, Maplewood, Minn.

[73] Assignee: Minnesota Mining and Manufacturing Company, St. Paul, Minn.

[21] Appl. No.: 57,584

[22] Filed: Jul. 16, 1979

[51] Int. Cl.³ .......................... C09J 7/02; B32B 17/10
[52] U.S. Cl. .................................... 428/350; 428/344; 428/351; 428/354; 428/355; 428/417; 428/436; 428/441; 428/913; 428/415
[58] Field of Search ............... 428/344, 350, 351, 354, 428/355, 913, 417, 436, 441, 415

[56] References Cited

U.S. PATENT DOCUMENTS

| | | | |
|---|---|---|---|
| 2,774,421 | 12/1956 | Lion | 428/355 |
| 3,290,203 | 12/1966 | Antonson | 428/355 |
| 3,681,179 | 8/1972 | Theissen | 428/355 |
| 3,775,226 | 11/1973 | Windorf | 428/355 |
| 3,949,134 | 4/1976 | Willdorf | 428/215 |
| 4,017,661 | 4/1977 | Gillery | 428/412 |
| 4,095,013 | 6/1978 | Burger | 428/522 |

FOREIGN PATENT DOCUMENTS

| | | | |
|---|---|---|---|
| 987428 | 9/1979 | Canada | 428/355 |
| 7708479 | 8/1977 | Netherlands | 428/355 |

*Primary Examiner*—Marion McCamish
*Attorney, Agent, or Firm*—Cruzan Alexander; Donald M. Sell; Richard E. Brink

[57] ABSTRACT

Certain adhesive compositions which are soluble in organic solvents and insoluble in water but activatable thereby, are useful in adhering transparent polymeric foils (especially energy control sheets) to glass. The adhesives, which comprise a blend of (a) methyl vinyl ether:maleic anhydride copolymers or half esters thereof and (b) polyfunctional epoxide or aziridine crosslinker, impart excellent moisture-resistance to laminates.

4 Claims, No Drawings

WATER-ACTIVATABLE CROSSLINKED ADHESIVE AND ENERGY CONTROL FILM MADE THEREWITH

BACKGROUND OF THE INVENTION

This invention relates to compositions of the type which are rendered adhesive by the application of water and is particularly concerned with energy control sheets having a thin layer of such an adhesive bonded to one face thereof.

Energy control sheets, which are commonly used in conjunction with a window to inhibit passage of solar energy into a room, have been known for many years. Lion U.S. Pat. No. 2,774,021, for example, discloses a window shade in which a transparent or translucent self-supporting cellulosic foil is coated with a transparent-reflective layer of metal on the side adjacent the window, a protective layer of varnish or the like optionally being applied over the metal layer to reduce corrosion or mechanical damage.

A more sophisticated and efficient form of energy control film is shown in Antonson et al U.S. Pat. No. 3,290,203, which describes and claims a window unit in which a transparent polymeric foil is provided with a transparent-reflective metal layer on one face, the metal layer being protectively covered by a transparent protective layer which in turn is adhered to the inside of a conventional windowpane. The transparent protective layer may be either a coating or, if desired, a second self-supporting foil, as is shown in, e.g., Windorf U.S. Pat. No. 3,775,226.

Another form of energy control sheet is shown in copending Dahlen, Hansen and Weiher application Ser. No. 867,321, which discloses a product that not only excludes much of the undesired solar radiation from a room during summer months but also greatly reduces the transmission of near infra-red energy from inside the room to the outside during the winter months.

Still another form of energy control sheet, in which a polymeric substrate is consecutively coated with titanium suboxide, a transparent-reflective metal layer, and titanium suboxide is shown in Gillery U.S. Pat. No. 4,017,661.

Other forms of energy control film include the type in which a polyester foil is provided with a layer of dyed or pigmented copolyester resin, an adhesive typically being used to bond the copolyester layer to a windowpane.

Where energy control sheets are adhered to the inside of a windowpane, several types of adhesives have been employed. Water-soluble adhesives, such as are disclosed in the aforementioned Antonson et al patent, can either be applied to a windowpane in aqueous solution at the time of mounting the energy control sheet or, alternatively, pre-coated on the energy control film and dried, permitting reactivation at the time of mounting. An energy control sheet which has been adhered to a windowpane by means of such an adhesive can be removed after applying damp newspapers to the exposed surface, the moisture penetrating the backing and reducing the bonding properties of the adhesive. The existence of high humidity, condensation or frost over extended periods of time, however, often causes the sheet to pull irregularly away from the windowpane, creating water or air pockets which are sometimes known as "fingers" because of their appearance. The blending of silanes into some water-soluble adhesives substantially eliminates the "fingers" problem, but adhesion to the glass becomes so great that the sheet can be removed only by scraping with a razor blade.

The use of normally tacky and pressure-sensitive adhesives, which are normally not affected by moisture, overcomes the humidity-related problems described in the preceding paragraph. Adhesion is adequate but not so high that the sheet cannot be removed when desired. On the negative side, however, pressure-sensitive adhesives cannot conveniently be applied to a windowpane at the time an energy control sheet is to be installed; hence, the manufacturer of the sheet must supply the product pre-coated with adhesive. The tacky nature of such adhesives dictates that they be either provided with a temporary removable liner or protected with a detackifying water-soluble coating; see Theissen U.S. Pat. No. 3,681,179. Even so, application of large sheets coated with pressure-sensitive adhesive requires considerable care because of the adhesive's tendency to bond prematurely to the glass during the process of positioning and the difficulty in totally removing all air or liquid from between the adhesive and the glass after positioning. Additionally, it has been found difficult to provide a pressure-sensitive adhesive coating which has the optical clarity possessed by water-soluble adhesives.

Energy control sheets have also been held to windowpanes by means of one of the so-called "cling" vinyl adhesives, e.g., as disclosed in Willdorf U.S. Pat. No. 3,949,134 or Burger U.S. Pat. No. 4,095,013. While such adhesives also possess excellent moisture-resistance, they are intended for ready removability, permitting the sheets to be repeatedly removed and installed as desired. Consequently, they do not adhere so firmly to the windowpane as either of the other two adhesives previously discussed, a fact which may result in unintentional removal or vandalism caused by curious or destructive persons' picking at the energy control sheet.

SUMMARY

The present invention provides an adhesive having an unusually attractive combination of features for use with energy control sheets. The adhesive is easily applied, and when used to bond sheets to a windowpane, it displays a high degree of optical clarity, excellent adhesion, and outstanding resistance to humidity, condensation, and frost, even over extended periods of time. While the adhesive is substantially water-insoluble, it is nevertheless water-activatable, and the application of wet newspapers to a sheet adhered to a windowpane swells and softens the adhesive enough to permit ready removal without leaving adhesive residue on the glass.

The adhesive of the invention comprises in combination a blend of (a) a polymeric substance which is either a copolymer of methyl vinyl ether and maleic anhydride or a half ester of such a copolymer and (b) a nonmetallic, organic solvent-soluble crosslinking agent which is either a polyfunctional epoxide or a polyfuntional aziridine, i.e., a compound or polymer incorporating a plurality of either

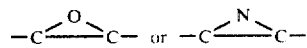

rings. In either case, the important aspect of the crosslinking agent is its ring content, and the specific nature of the backbone or other substituents is not especially critical.

PERFORMANCE TESTS

Three types of test have been found helpful in evaluating the ability of adhesives to hold an energy control sheet in contact with a windowpane during adverse conditions and yet permit it to be removed. In each case, a 50-micrometer biaxially oriented polyethylene terephthalate foil is vapor coated with aluminum to a thickness of about 0.015 micrometer, overcoated with a methyl ethyl ketone solution of a saturated copolyester resin and the solvent evaporated to leave a dried protective layer weighing about 4–5 g/m$^2$, substantially as described in Example 2 of Antonson et al U.S. Pat. No. 3,290,203. An organic solvent solution of the adhesive to be evaluated is then applied and the solvent allowed to evaporate at room temperature for 12 hours, leaving a dried adhesive layer weighing approximately 0.4 g/m$^2$.

Moisture Resistance

The adhesive-coated face of a 30.5-cm × 30.5-cm energy control sheet (as described in the preceding paragraph) is moistened, applied to a carefully cleaned 30.5-cm × 30.5-cm smooth glass plate and pressed into firm contact using a rubber blade. The resultant laminate is then dried one of two ways, either 3–5 days at room temperature or, to expedite testing, 24 hours at room temperature and 12 hours at 65° C. The laminates are then totally submerged in room temperature tap water and visually inspected every ½ hour for the first day and every 12 hours thereafter. Failure is deemed to have occurred whenever the adhesive separates from the glass in any area 3 mm or more in any dimension.

Adhesion

A 30.5-cm × 30.5-cm laminate is prepared and dried as in the preceding moisture resistance test. Using a straightedge and a razor blade, a 6.4-mm strip of adhered sheet is cut adjacent one edge. If the strip cannot be cleanly removed from the glass without scraping, it is deemed to pass the test.

Removability

The adhesion test just described is repeated after first soaking the laminate for 30 minutes in room temperature tap water. If the 6.4-mm strip can be cleanly removed from the glass by hand pulling, it is deemed to pass the test. Alternatively, a laminate about one meter square can be prepared and dried. When sprayed with water and covered with a 25-micrometer polyester foil for one hour, a satisfactory adhesive will permit the sheet to be similarly removable by hand without leaving any residue on the glass.

GLOSSARY

For convenience in tabulating the examples, the following abbreviations have been employed:

| Abbreviation | Chemical Composition |
|---|---|
| | Crosslinking Epoxides |
| E431 | Polyglycidyl ether of novolac resin, available from Dow Chemical Company under the trade designation "DEN 431" |
| E812 | Triglycidyl ether of glycerol, available from Shell Chemical Company under the registered trademark designation "Epon" 812. |
| E1004 | Diglycidyl ether of bis-phenol A, having a melting point of 95–105° C., available from Shell Chemical Company under the registered trademark designation "Epon" 1004. |
| E1009 | Diglycidyl ether of bis-phenol A, having a melting point of 145–155° C., available from Shell Chemical Company under the registered trademark designation "Epon" 1009. |
| E1031 | Polyglycidyl ether of tetraphenylene ethane available from Shell Chemical Company under the registered trademark designation "Epon" 1031. |
| E4221 | 3,4-epoxycyclohexyl methyl-3,4-epoxycyclohexane carboxylate available from Union Carbide under the trade designation "ERLA 4221" |
| E5014 | Tertiary butyl glycidyl ether, commercially available from Celanese Corporation under the registered trademark designation "Epi-Rez" 5014. (Monofunctional epoxy, used as control) |
| | Interpolymers and Partial Esters |
| GA119 | Low molecular weight interpolymer of methyl vinyl ether and maleic anhydride, having a specific viscosity (1 gram of polymer in 100 ml of methyl ethyl ketone at 25° C.) of 0.1–0.5, commercially available from GAF Corporation under the registered trademark designation "Gantrez" AN-119. |
| GA139 | Medium molecular weight interpolymer of methyl vinyl ether and maleic anhydride, having a specific viscosity of 1.0–1.4, commercially available from GAF Corporation under the registered trademark designation "Gantrez" AN-139. |
| GA149 | Medium molecular weight interpolymer of methyl vinyl ether and maleic anhydride, having a specific viscosity of 1.5–2.0, commercially available from GAF Corporation under the registered trademark designation "Gantrez" AN 149. |
| GA169 | High molecular weight interpolymer of methyl vinyl ether and maleic anhydride, having a specific viscosity of 2.6–3.5, commercially available from GAF Corporation under the registered trademark designation "Gantrez" AN 169. |
| GA903 | Low molecular weight interpolymer of methyl vinyl ether and maleic anhydride, having a specific viscosity of 0.8–1.2, commercially available from GAF Corporation, under the registered trademark designation "Gantrez" A903. |
| GE225 | Ethyl half-ester of methyl vinyl ether:maleic anhydride copolymer, having an acid number of 275–300, commercially available from GAF Corporation under the registered trademark designation "Gantrez" |

-continued

| Abbreviation | Chemical Composition |
|---|---|
| GE335 | ES 225.<br>Isopropyl half-ester of methyl vinyl ether:maleic anhydride copolymer, having an acid number of 250-280, commercially available from GAF Corporation under the registered trademark designation "Gantrez" ES 335. |
| | Polyfunctional Aziridines |
| NBPIA | N,N-bis-1,2 propylenisophthalamide. |
| NPEI | Polyethylene imine, commercially available from K&K Laboratories, Inc. under the trade designation No. 18151. |
| NTCX | Tri(N,N-bis-4,5 hexanoic) trimethylolpropane, commercially available from Polyvinyl Chemicals, Inc. under the trade designation "CX-100". |

Presently Preferred Embodiments

In each of the examples in Table I below, a 1% solution of GA119 interpolymer in equal volumes of ethanol and toluene was prepared. A 1% solution of E1004 polyepoxide crosslinking agent was also prepared, again using a 1:1 ethanol:toluene blend as solvent. Appropriate volumes of the interpolymer and crosslinking agent were then blended to obtain the desired percentage of crosslinking agent in the system (based on total adhesive) and applied over the polyester barrier coat at a coating weight of approximately 0.4 g/m². The solvent was evaporated at room temperature for 3 days. Sample preparation and tests of moisture resistance, adhesion and removability were then carried out in accordance with the procedures described above.

TABLE I

Effectiveness of Varying Amounts of Polyfunctional Epoxide Crosslinking Agent

| Example | Epoxide Type | % | Time to initial failure, hours |
|---|---|---|---|
| Control | — | 0 | 0.5 |
| 1 | E1004 | 1 | 1.5 |
| 2 | " | 2 | 4 |
| 3 | " | 4 | 4 |
| 4 | " | 6 | 5 |
| 5 | " | 8 | 24+ |
| 6 | " | 10 | 24+ |
| 7 | " | 15 | 24 |
| 8 | " | 20 | 24 |
| 9 | " | 25 | 24 |

Adhesion and removability were satisfactory in all cases.

The examples in Table II below are closely related to those in Table I except that a variety of polyepoxide crosslinkers were employed and the energy control sheet-glass laminates were all dried for 24 hours at room temperature and then for 12 hours at 65° C. before testing.

TABLE II

Effectiveness of Various Polyfunctional Epoxide Crosslinking Agents

| Example | Epoxide Type | % | Time to initial failure, hours |
|---|---|---|---|
| Control | — | 0 | 5 |
| Control | E5014 | 10 | 2 |
| 10 | E1004 | 8 | 336+ |
| 11 | " | 10 | 336+ |
| 12 | " | 15 | 336+ |
| 13 | " | 20 | 336+ |
| 14 | " | 25 | 336+ |
| 15 | E1009 | 1 | 36 |
| 16 | " | 5 | 168+ |
| 17 | " | 10 | 168+ |
| 18 | E4221 | 1 | 168+ |
| 19 | " | 5 | 168+ |
| 20 | " | 10 | 96+ |
| 21 | E431 | 10 | 24 |
| 22 | E812 | 10 | 96 |
| 23 | E1031 | 10 | 48 |

Adhesion and removability were satisfactory in all cases.

It is recognized that previous manufacturers of solar control films have suggested that epoxy silanes might be blended with methyl vinyl ether interpolymer resins for use as adhesives; see, e.g., Dutch Patent Application 7708479. It is understood that the epoxy silane is monofunctional insofar as the existence of oxirane rings is concerned but that crosslinking of the interpolymer carboxyl groups may occur through the silane portion of the epoxy silane. Such compositions enhance the water resistance of the interpolymer and essentially eliminate "fingering" when the adhesive is used to bond an energy control film to a windowpane; however, the adhesive bonds so firmly to the glass that the film cannot be stripped free and must be removed by a tedious scraping process, even after prolonged soaking in water. In contrast, the polyfunctional epoxides and aziridines of the present invention crosslink the methyl ethyl ether:maleic anhydride copolymer to form a water-insoluble but hydrophilic gel in which the carboxyl groups are mobile in the aqueous phase. Once a water-swollen gel is placed in contact with the windowpane, the polar carboxyl groups bond firmly to the glass, the adhesive retaining its strength even after the water in the gel has been evaporated. When water is subsequently applied to the exposed surface of the dried energy control sheet, it is transmitted therethrough and again causes the hydrophilic gel to swell. Although the swollen gel remains bonded to the glass firmly enough to maintain the position of the energy control sheet on the glass in void-free condition, the bonding strength is sufficiently reduced that the energy control film can be stripped away cleanly, leaving essentially no residue on the glass surface.

The procedure of Example 6 was repeated, using the same type (E1004) and amount (10%) of polyfunctional epoxide but varying the type of interpolymer. Results are tabulated below:

TABLE III

Comparative Effectiveness of 10% Polyepoxide Crosslinker with Various Types of Methyl Vinyl Ether Interpolymers

| Example | Interpolymer | Time to initial failure, hours |
|---|---|---|
| Control | GA119 | 5 |

TABLE III-continued

Comparative Effectiveness of 10% Polyepoxide Crosslinker with Various Types of Methyl Vinyl Ether Interpolymers

| Example | Interpolymer | Time to initial failure, hours |
|---|---|---|
| 24 | " | 360+ |
| Control 25 | GA139 | 30 |
| " | " | 360+ |
| Control 26 | GA149 | 168 |
| " | " | 360+ |
| Control 27 | GA169 | 72 |
| " | " | 360+ |
| Control 28 | GA903 | 48 |
| " | " | 360- |
| Control 29 | GE225 | 4 |
| " | " | 168 |
| Control 30 | GE335 | 4 |
| " | " | 360+ |

Adhesion and removability were satisfactory in all cases.

As previously pointed out, the second class of crosslinking agents suitable for practicing the invention, includes the polyfunctional aziridines. Suitable compounds include, among others, polyalkylene amides, polyethylene ureas, polycarbamates, thiophosphonic acid diamines, bis-dimethylene thiuram polysulfides, polyalkylene imines, etc. The effectiveness of representative polyaziridines as crosslinking agents for the methyl vinyl ether:maleic anhydride interpolymers is shown in Table IV; GA903 is used as the interpolymer in all cases.

TABLE IV

Effectiveness of Various Polyfunctional Aziridines as Crosslinking Agents

| Example | Polyamine Type | % | Time to initial failure, hours |
|---|---|---|---|
| Control | — | 0 | 48 |
| 30 | NBPIA | 1 | 120+ |
| 31 | " | 10 | 360+ |
| 32 | NTCX | 1 | 168+ |
| 33 | NPEI | 1 | 120+ |

Adhesion and removability were satisfactory in all cases.

It will be noted that a substantially lesser quantity of this type of crosslinker is required to obtain results comparable to that using the polyepoxides as crosslinkers. It has been found that when relatively large amounts of the polyaziridine crosslinkers are employed (e.g., 10%), exposure to moisture tends to impart a somewhat milky appearance which disappears when the adhesive dries out.

Others have previously suggested adding a variety of crosslinking agents to methyl vinyl ether:maleic anhydride interpolymers, e.g., polyhydroxy compounds, polyamines, and polyvinyl pyrrolidones; various polyvalent metallic salts, halogens and gelatin have also been said to impart water-insolubility. Such crosslinking agents have been found to yield adhesives having properties which are unsatisfactory for use with energy control films because they fail to impart a sufficiently high degree of moisture resistance, yield precipitates during preparation, or bond so firmly that they cannot be removed cleanly after being soaked in water.

The foregoing description and examples will no doubt lead those skilled in the art to numerous variations falling within the scope of the invention. To illustrate, the adhesive described herein can be used to adhere protective foils to glass surfaces for the purpose of imparting shatter resistance.

What is claimed is as follows:

1. An energy control sheet comprising a transparent polymeric foil having bonded over one face a layer of water-activatable adhesive comprising in combination a blend of
   (a) a polymeric substance selected from the class consisting of
      (1) a copolymer of methyl vinyl ether and maleic anhydride and
      (2) a half ester of said copolymer and
   (b) a nonmetallic organic solvent-soluble crosslinking agent selected from the class consisting of
      (1) polyfunctional epoxides and
      (2) polyfunctional aziridines,
whereby when said adhesive is activated with water, said sheet is bonded to a windowpane to form a laminate, and said water is evaporated, the laminate thereafter possesses outstanding moisture resistance for extended periods of time but the sheet, after soaking in water, can be removed cleanly from the glass by simple hand pulling.

2. A laminate comprising a pane of glass to one face of which the energy control sheet of claim 1 is bonded by the water-activatable adhesive.

3. An energy control sheet comprising a transparent polymeric foil having a transparent-reflective metallic layer on one face thereof, a corrosion-inhibiting protective layer bonded to said metallic layer, and a water-activatable adhesive overlying and bonded to said protective layer, said adhesive comprising in combination a blend of
   (a) a polymeric substance selected from the class consisting of
      (1) a copolymer of methyl vinyl ether and maleic anhydride and
      (2) a half ester of said copolymer and
   (b) a nonmetallic organic solvent-soluble crosslinking agent selected from the class consisting of
      (1) polyfunctional epoxides and
      (2) polyfunctional aziridines,
whereby when said adhesive is activated with water, said sheet is bonded to a windowpane to form a laminate, and said water is evaporated, the laminate thereafter possesses outstanding moisture resistance for extended periods of time but the sheet, after soaking in water, can be removed cleanly from the glass by simple hand pulling.

4. A moisture-resistant energy control unit comprising a windowpane to which the energy control sheet of claim 3 is laminated by means of the water-activatable adhesive.

* * * * *